US008364487B2

United States Patent
Ju et al.

(10) Patent No.: US 8,364,487 B2
(45) Date of Patent: Jan. 29, 2013

(54) SPEECH RECOGNITION SYSTEM WITH DISPLAY INFORMATION

(75) Inventors: Yun-Cheng Ju, Bellevue, WA (US); Julian J. Odell, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 988 days.

(21) Appl. No.: 12/255,270

(22) Filed: Oct. 21, 2008

(65) Prior Publication Data

US 2010/0100384 A1     Apr. 22, 2010

(51) Int. Cl.
*G10L 15/18* (2006.01)
(52) U.S. Cl. .................. 704/257; 704/270; 704/256.1; 704/258
(58) Field of Classification Search .............. 704/270, 704/251, 235, 8, 257, 277, 3, 9, 256, 10, 704/243, 275, 256.1, 260, 231, 258, 252, 704/271; 379/88.01; 434/185; 715/703; 381/2; 455/466
See application file for complete search history.

(56) References Cited

U.S. PATENT DOCUMENTS

| | | | |
|---|---|---|---|
| 4,914,704 A | | 4/1990 | Cole et al. |
| 5,384,892 A * | | 1/1995 | Strong .......................... 704/243 |
| 5,970,449 A | | 10/1999 | Alleva et al. |
| 6,252,589 B1 * | | 6/2001 | Rettig et al. .................. 715/703 |
| 6,269,335 B1 * | | 7/2001 | Ittycheriah et al. ............ 704/270 |
| 6,272,455 B1 * | | 8/2001 | Hoshen et al. .................. 704/1 |
| 6,694,296 B1 | | 2/2004 | Alleva et al. |
| 7,251,600 B2 * | | 7/2007 | Ju et al. .......................... 704/257 |
| 7,684,988 B2 * | | 3/2010 | Barquilla .................... 704/256.1 |
| 2002/0116196 A1 * | | 8/2002 | Tran .............................. 704/270 |
| 2005/0005266 A1 * | | 1/2005 | Datig ............................ 717/136 |
| 2005/0043949 A1 * | | 2/2005 | Roth et al. .................... 704/251 |
| 2005/0203750 A1 | | 9/2005 | Miyamoto et al. |
| 2006/0069545 A1 | | 3/2006 | Wu et al. |
| 2007/0099636 A1 | | 5/2007 | Roth |
| 2007/0208569 A1 * | | 9/2007 | Subramanian et al. ........ 704/270 |
| 2007/0244890 A1 | | 10/2007 | Dunning et al. |
| 2007/0250317 A1 | | 10/2007 | Davis et al. |
| 2007/0260448 A1 * | | 11/2007 | Lorenzen et al. ................. 704/1 |
| 2009/0070099 A1 * | | 3/2009 | Anisimovich et al. ............ 704/5 |
| 2009/0124272 A1 * | | 5/2009 | White et al. .................. 455/466 |

FOREIGN PATENT DOCUMENTS
WO      WO2008089469 A1     7/2008

OTHER PUBLICATIONS

Ollason, et al., "MS Connect: A Fully Featured Auto-attendant: System Design, Implementation and Performance", Retrieved Aug. 6, 2008 at <<http://research.microsoft.com/srg/papers/2004-yuncj-icslp.pdf>>, In Proceedings of ICSLP, 8th International Conference on Spoken Language Processing (InterSpeech 2004), Oct. 4-8, 2004, pp. 2845-2848.

Levin, et al., "Voice User Interface Design for Automated Directory Assistance", Retrieved Aug. 6, 2008 at <<http://www-cs.ccny.cuny.edu/~esther/papers/da_eurospeech_05.pdf>>, In Proceedings of Eurospeech, 9th European Conference on Speech Communication and Technology (InterSpeech 2005), Sep. 4-8, 2005, pp. 2509-2512.

(Continued)

*Primary Examiner* — Vijay B Chawan

(57) ABSTRACT

A language processing system may determine a display form of a spoken word by analyzing the spoken form using a language model that includes dictionary entries for display forms of homonyms. The homonyms may include trade names as well as given names and other phrases. The language processing system may receive spoken language and produce a display form of the language while displaying the proper form of the homonym. Such a system may be used in search systems where audio input is converted to a graphical display of a portion of the spoken input.

20 Claims, 3 Drawing Sheets

OTHER PUBLICATIONS

Adda, et al., "Text Normalization and Speech Recognition in French", Retrieved Aug. 6, 2008 at <<http://citeseerx.ist.psu.edu/viewdoc/summary?doi=10.1.1.29.6163>>, In Proceedings of the European Conference on Speech Technology, EuroSpeech, vol. 5, (1997), pp. 2711-2714.

Paul, et al., "The Design for the Wall Street Journal-based CSR Corpus", Retrieved Aug. 6, 2008 at http://www.aclweb.org/anthology-new/H/H92/H92-1073.pdf>>, In Proceedings of International Conference on Spoken Language Processing, Oct. 12-16, 1992 (ICSLP 92), pp. 899-902.

Acero, et al., "Live Search for Mobile: Web Services by Voice on the Cellphone", Retrieved Aug. 6, 2008 at <<http://research.microsoft.com/users/xiaol/papers/icassp2008b.pdf>>, In Proceedings of the Proceedings of the IEEE International Conference on Acoustics, Speech, and Signal Processing (ICASSP-2008), Mar. 30-Apr. 4, 2008, pp. 5256-5259.

Yu, et al. "Automated Directory Assistance System—from Theory to Practice", Retrieved Aug. 6, 2008 at <<http://research.microsoft.com/~dongyu/papers/directoryassistance-interspeech2007.pdf>>, In Proceedings of Interspeech 2007, 8th Annual Conference of the International Speech Communication Association, (ISCA 2007), Antwerp, Belgium, Aug. 27-31, 2007, pp. 2709-2712.

Ju, et al., "Call Analysis with Classification Using Speech and Non-Speech Features", Retrieved Aug. 6, 2008 at <<http://research.microsoft.com/srg/papers/2006-yuncj-interspeech.pdf>>, In Proceedings of The Ninth International Conference on Spoken Language Processing (Interspeech 2006—ICSLP), Sep. 17-21, 2006, pp. 1902-1905.

Bacchiani, et al. "Deploying GOOG-411: Early Lessons in Data, Measurement, and testing", Retrieved Aug. 6, 2008 at <<http://research.google.com/archive/goog411.pdf>>, In Proceedings of IEEE International Conference on Acoustics, Speech and Signal Processing (ICASSP 2008), 2008, pp. 5260-5263.

Chang, et al., "Modalities and Demographics in voice search: learnings from three case studies", Retrieved Aug. 6, 2008 at <<http://www.ieeexplore.ieee.org/iel5/4505270/4517521/04518844.pdf?tp=&isnumber=4517521&arnumber=4518844&htry=1>>, In Proceedings of IEEE International Conference on Acoustics, Speech and Signal Processing (ICASSP 2008), 2008, pp. 5252-5255.

Li, et al., "Language Modeling for Voice Search: a Machine Translation Approach", Retrieved Aug. 6, 2008 at <<http://research.microsoft.com/users/xiaol/papers/icassp2008a.pdf>>, In Proceedings of IEEE International Conference on Acoustics, Speech and Signal Processing (ICASSP 2008), 2008, pp. 4913-4916.

"VoiceSignal", Retrieved Aug. 6, 2008 at <<http://www.voicesignal.com/solutions/index.php>>, VoiceSignal Technologies, Inc., 2007, 1 page.

"Google Offers Voice Local Search Service on Mobile Phones", Retrieved Aug. 6, 2008 at <<http://www.i4donline.net/news/news-details.asp?newsid=8628>>, ComputerWorld, Apr. 10, 2007, 1 page.

"Yahoo! oneSearch with Voice", Retrieved Aug. 6, 2008 at <<http://in.mobile.yahoo.com/onesearch/voice>>, Yahoo! Web Services India, 2008, 2 pages.

Ju, et al., "A Language-Modeling Approach to Inverse Text Normalization and Data Cleanup for Multimodal Voice Search Applications", In Proceedings of Interspeech 2008, 9th Annual Conference of the International Speech Communication Association, Brisbane, Australia, Sep. 22-26, 2008 (ISCA 2008), pp. 2179-2182.

* cited by examiner

SPEECH RECOGNITION SYSTEM WITH DISPLAY INFORMATION

BACKGROUND

Speech recognition and synthesis technologies often use text normalization techniques to create a smaller set of vocabulary from which language may be processed. By using a smaller vocabulary, a speech recognition or speech synthesis system may operate in a faster, more efficient manner.

Some text normalization techniques include conversion of symbols and digits. Such conversion may be performed by rules, such as converting the symbol "#" to the word "number". Another technique may involve homonyms, such as converting the tradenames "Lowe's" and "Loews" to "Lows", as defined in a dictionary. Still another technique may involve breaking a word into common pre- and post-fixes, as defined in a dictionary.

The text normalization techniques allow a more consistent and smaller set of vocabulary. In one use, a spoken version of the name "Allen" may be converted through text normalization dictionary to include both "Allen" and "Alan". Subsequent processing, such as performing a search using the spoken input, would search for all homonyms of "Alan", including "Allen".

SUMMARY

A language processing system may determine a display form of a spoken word by analyzing the spoken form using a language model that includes dictionary entries for display forms of homonyms. The homonyms may include tradenames as well as given names and other phrases. The language processing system may receive spoken language and produce a display form of the language while displaying the proper form of the homonym. Such a system may be used in search systems where audio input is converted to a graphical display of a portion of the spoken input.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
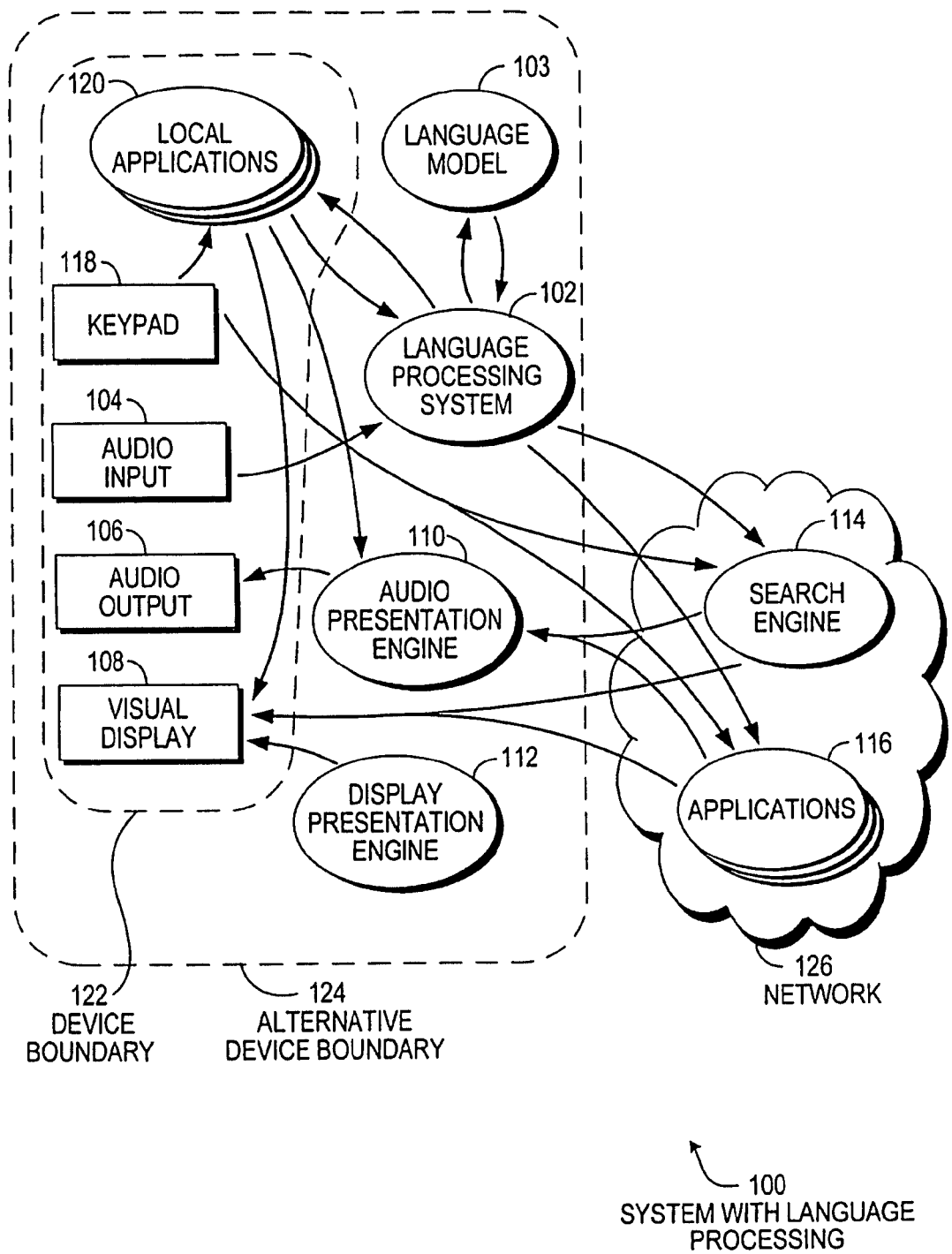
FIG. 1 is a diagram illustration of an embodiment showing a system that may process spoken language.

A language processing system uses a language model that performs text normalization and also inverse text normalization on some homonyms. When text is analyzed, the homonyms may be represented by one of several display forms of the homonym. The selected display form of the homonym may be used to present a visual representation of the text.

The language processing system may be useful in analyzing spoken form of search requests, for example. When a user speaks a search request, an automated speech recognition system may parse the spoken words into word elements, and a language model may be used to determine the most likely words used in the spoken words. Because the language model may include separate display forms of some homonyms, the language model may process the spoken words to select one of the display forms for the homonym. In the example, the user may be presented with the proper display form of the homonym on a user interface display. In some cases, the user may verify the display form and a search may be performed using the display form.

The language processing system is particularly useful in systems that use trade names and trademarks. Often, a trade name may have a similar or identical sound to a normal dictionary word, but may be spelled differently.

For example, the trade names "Lowe's Hardware" and "Loews Theater Group" share a similar pronunciation with the dictionary word "lows". The language processing system may include separate rules or dictionary entries for the terms "Lowe's" and "Loews", which may be the display versions for the terms. In the language model, the term "Lowe's" would be associated with "Hardware" and the term "Loews" would be associated with "Theater".

In a typical use scenario, a user may speak a search request into a mobile device such as a mobile telephone. The spoken words may be analyzed and a display form of the words may be presented on the mobile telephone display. In many cases, the display may show a disambiguation page where two or more options are presented to the user. The user may select one of the options and a search may be performed using the selected option. In other cases, the search results may be presented using the display forms of the different homonyms.

In the example above, the user may speak the phrase "Directions to Lowe's". A disambiguation display may be presented showing "Lowe's Hardware" and "Loews Theater Group", and the user may select the first option. A search may be performed using the "Lowe's Hardware" selection, and the display may show directions to the nearest Lowe's Hardware.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a system that has a language processing system 102. Embodiment 100 is a simplified example of an environment where a language processing system 102 may be used. While many other environments may use a language processing system 102, embodiment 100 is selected to show one use where a language processing system 102 that uses a single language model 103 that may perform both text normalization and inverse text normalization.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

The language processing system 102 may perform both text normalization and inverse text normalization. Text normalization is a mechanism to determine the word units in a speech recognition or speech synthesis system. Text normalization is a process whereby several words or phrases may be 'normalized' or made equivalent to a single word or phrase. For example, the terms "Mc Donalds", "Mc-Donald's", "McDonalds", and "McDonald's" may be normalized to the single term "McDonalds". Text normalization is a method by which the universe of words in a vocabulary is minimized. A minimized vocabulary can be processed much more efficiently. In the example, a vocabulary that contains five different entries for "McDonalds" may consume five times the storage space and potentially five times the processing cycles of a vocabulary that has one equivalent term.

Text normalization is often performed as a precursor to creating a language model. A language model assigns a probability to a sequence of words based on a probability distribution. A common mechanism is to create a language model using n-gram models and approximating the probability of a sequence of words using the Markov property. A corpus of language is used to train the language model to develop the probability statistics used in the n-gram models using maximum likelihood estimation.

After a language model is developed, a language processing system may return the most likely sequence of words given an input. Such a system may be used in audio speech recognition in order to determine what words were most likely to have been spoken by a user.

In voice recognition applications, text normalization may be used in at least three different contexts. Symbols and digits may be converted to text, such as converting "#" to "number" and "24/7" to "twenty four seven". Such conversions are generally defined using rules. Homonyms and abbreviations may be replaced as defined in a dictionary. In the McDonalds example above, the term "McDonalds" may be substituted for each version of spelling, capitalization, or punctuation. In many applications, text normalization may include breaking words into common prefixes and post fixes. In voice recognition applications, text normalization may be performed on the corpus of language used to develop or train a language model.

Inverse text normalization is a process by which a specific version of a word or phrase is selected from several versions or homonyms of a word or phrase. When a homonym of a word or phrase is encountered, an inverse text normalization process may determine which of several words or phrases of the homonyms are most likely to be represented.

Tradenames pose a special problem with homonyms. In many cases, a business name may be a name that uses unconventional or improper spelling or presentation of common dictionary words. In many cases, such tradenames may be trademarked or may use a person's family name or version of a family name.

For example, the pharmacy chain "Rite Aid" uses a differently spelled version of "right". In another example, "Lowe's Hardware" and "Loews Theater" use two different spellings of the word "lows".

In an audio search system, a user may speak a search term that is subsequently analyzed by a language processing system 102 and displayed on a visual display.

In a typical use scenario, a user may activate a search function on a cellular telephone, for example, and speak the name of a location to find. The language processing system 102 may process the speech and determine a list of options that match the spoken word or phrase. In some cases, the search system may display search results, such as on the user's cellular telephone display. In such a scenario, the user may speak the word "Lowe's" to start the search. The language processing system 102 may present options for "Lowe's Hardware" and "Loews Theaters", from which the user may select one result for further processing, such as finding directions or visiting a website. A user may recognize and select "Lowe's Hardware" but may be unfamiliar or uncomfortable if the language processing system presented "Lows Hardware".

In many situations, competing businesses may have names or services that sound similar to better known competitors, and the proper spelling of the business name in the displayed results may be a mechanism to disambiguate an audio request.

The language processing system 102 may have a language model 103 that may generate a display form of a spoken word. The language model 103 may be generated by defining a corpus of language that includes display forms of certain homonyms as separate word units. For example, training sentences in the corpus may include "[Rite] Aid Pharmacy", "[Lowe's] Hardware", and "[Loews] Theater", where the words in square brackets are display forms of a homonym.

In one embodiment, square brackets may be used to identify display forms within a language model. Other embodiments may use different notation. The square brackets or other notation may be removed from the display form when the text is presented on a visual display.

When the analyzed text is presented through an automated speech generator, the pronunciations of the display forms of a homonym may be linked to the pronunciation of the homonym so that a single pronunciation definition may be shared by each display form of a homonym.

The corpus may include text normalized training sentences, but may also include display forms of some words so that the resulting automated speech recognition may include proper display forms of tradenames and other homonyms. By keeping separate display forms for tradenames and other homonyms, a single language model 103 may be used for analyzing spoken text and for inverse text normalization.

The single language model 103 may be larger than a typical text normalized database, since the language model 103 may include many more tradenames as homonyms. Such a language model may be more expensive from a computational standpoint than a text normalized language model. However, such a language model would have a separate language model for inverse text normalization for generating display forms of the homonyms.

For the purposes of this specification and claims, the term homonym is used in a broad sense to include words with similar pronunciations but may or may not be spelled differently. The term homonym as used may include homographs, homophones, heteronyms, heterophones, polysemes, capitonyms, and other groups of words that are similar by sound, spelling, and pronunciation.

The language processing system 102 may have many applications. Embodiment 100 is an example of one architecture in which the language processing system 102 may be used. The language processing system 102 may receive spoken information from an audio input 104 and process the spoken information into a sequence of words. The sequence of words may be used by a search engine 114, remote applications 116, local applications 120, or may be presented on an audio output 106 or visual display 108 using an audio presentation engine 110 or a display presentation engine 112. The search engine 114, remote applications 116, and local applications 120 may present information using the audio presentation engine 110 or the visual display 108.

In a search embodiment, a user may use an audio input device, such as a microphone, to generate a spoken search request. The spoken search request may be analyzed using the language processing system 102 to generate a sequence of words representing a search request. The language processing system 102 may present the sequence of words or a portion of the sequence of words on the visual display 108 for verification. In some cases, the language processing system 102 may generate a set of sequences of words when one or more of the words has a homonym. In such cases, two or more of the sequences of words may be presented on the visual display 108 for disambiguation.

In some cases, the search engine 114 may process the sequence of words and present the results of the search or a set of versions of sequence of words for disambiguation.

Similarly, other embodiments may use recorded or captured audio speech as input to various remote applications 116 that may be available over a network 126. The remote applications may be any type of application or service. In a typical architecture, the remote applications 116 may be located across a network 126 and provided by a server or other system.

The architecture of embodiment 100 may be implemented in several different ways. In some embodiments, the language processing system 102 may be a service that is accessed over a network connection. For example, a device boundary 122 may define a cellular telephone or other mobile device that contains an audio input 104 such as a microphone, an audio output 106 such as a loudspeaker, a visual display 108 such as a liquid crystal display, and a keypad 118. In such an example, the cellular telephone or other mobile device may have limited processing capabilities and may communicate with a remote service by sending a digitized audio file or other captured form of a spoken input to a remote server that performs the functions of the language processing system 102.

Such an architecture may be useful in scenarios where the language processing system 102 uses a large amount of computational power, or where the language model 103 may consume a large amount of data. Another example of such an architecture may be in scenarios where the language model 103 may be updated frequently and where such updates may be easier to maintain on a remote server than as distributed to many individual users.

Some embodiments of a mobile device may include the audio presentation engine 110 and display presentation engine 112, while others may not. The audio presentation engine 110 may be a speech synthesis mechanism that may generate an audio representation of an input string of words. The display presentation engine 112 may present a display form of a string of words. In the example above of a sequence of words "[Rite] Aid Pharmacy", the display presentation engine 112 may convert the sequence to "Rite Aid Pharmacy" in preparation for display on the visual display 108. In some embodiments, the display presentation engine 112 may also perform various formatting and other presentation functions.

In another embodiment, a device boundary 124 may illustrate an alternative system where a device contains the input and output mechanisms as well as the functions of the language processing system 102. Such an embodiment may be a personal computer or other non-mobile device, or may be a mobile device, cellular telephone, or some other type of device.

In some embodiments, the language processing system 102 may be incorporated into a search engine 114. In such an embodiment, the search engine 114 may receive audio recordings as part of a search request. The language processing system 102 may perform automated speech recognition to determine a sequence of spoken words, then the language processing system 102 may determine one or more probable sequences of words that represent the spoken words. The language processing system 102 may include one or more homonyms within the sequences of words. The search engine 114 may then perform a search using the sequences of words.

Figure 2:
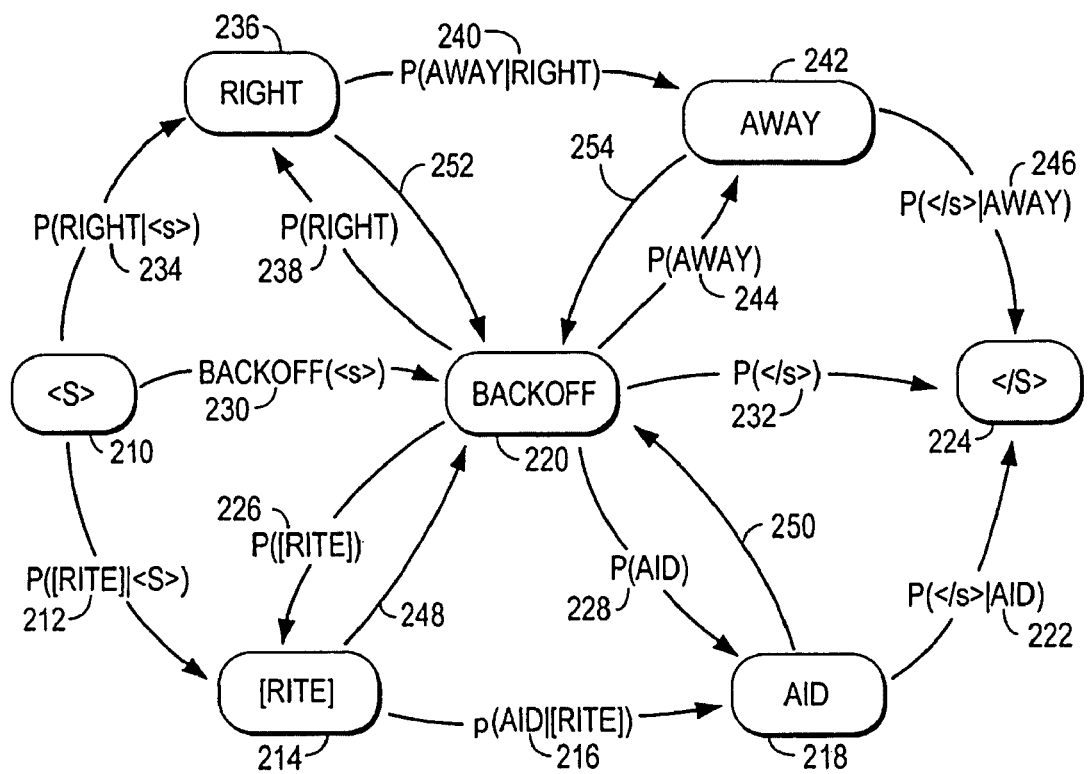
FIG. 2 is a diagram illustration of an example embodiment of a bigram in a context free grammar.
Figure 2:

FIG. 2 is an example embodiment 200 showing a bigram model for context free grammar for the terms "[Rite] Aid" and "right away". Embodiment 200 illustrates one example of how a homonym rule may be established to capture the context for a specific homonym. In the embodiment 200, the term "Rite" is associated with "Aid" and may refer to the tradename "Rite Aid".

Embodiment 200 is an example of a bigram. Other embodiments may have different organizations, use different terms, or may be configured in different manners. Embodiment 200 is presented as an example of a set of rules that may be used for a specific embodiment.

Embodiment 200 contains a text normalization sub-rule 202. Sub-rule 202 contains a display form "[Rite]" 204 that is linked by the term "right" 206. The term "</s>" 208 indicates the end of the sub-rule 202.

The bigram 208 illustrates the connections between the terms "Rite" and "Aid" and "right" and "away". The bigram begins with "<s>" representing the start of a sentence 210. The probability 212 is the probability of "[Rite]" being the first word after the start of the sentence 210, where "[Rite]" refers to the sub-rule 202, where "[Rite]" is a display form of "right". The term "[Rite]" 214 is connected to the start of the sentence 210 through the probability 212.

The terms "[Rite]" 214 and "Aid" 218 are linked by a probability 216 that the term "Aid" follows "Rite".

Similarly, the terms "right" 236 and "away" 242 are linked by a probability 240 that the term "away" follows "right". The term "right" 236 is linked to the start of the sentence 210 by the probability 234.

The probabilities 222 and 246 respectively represent the probabilities that "Aid" 218 and "away" 242 are the last words in a sentence, where "</s>" represents the end of a sentence 224.

The probabilities 226 and 238 represent the probabilities that the respective words "[Rite]" 214 and "right" 236 are the next words following a backoff 220. Similarly, the probabilities 228 and 244 represent the probabilities that the respective words "Aid" 218 and "away" 242 are the next words following a backoff 220. Each word may have a unigram backoff 248, 250, 252, and 254, respectively.

The backoff 220 is a mechanism by which a set of rules may be traversed to determine a probable sequence of words. In a typical language processing system, the backoff 220 may be used to traverse between different sets of bigrams or within a bigram to determine the most likely sequence of words. The backoff 220 may be used by the backoff probability 230 to traverse to another rule after the beginning of a sentence 210, or may be used to end a sentence by the probability 232.

Figure 3:
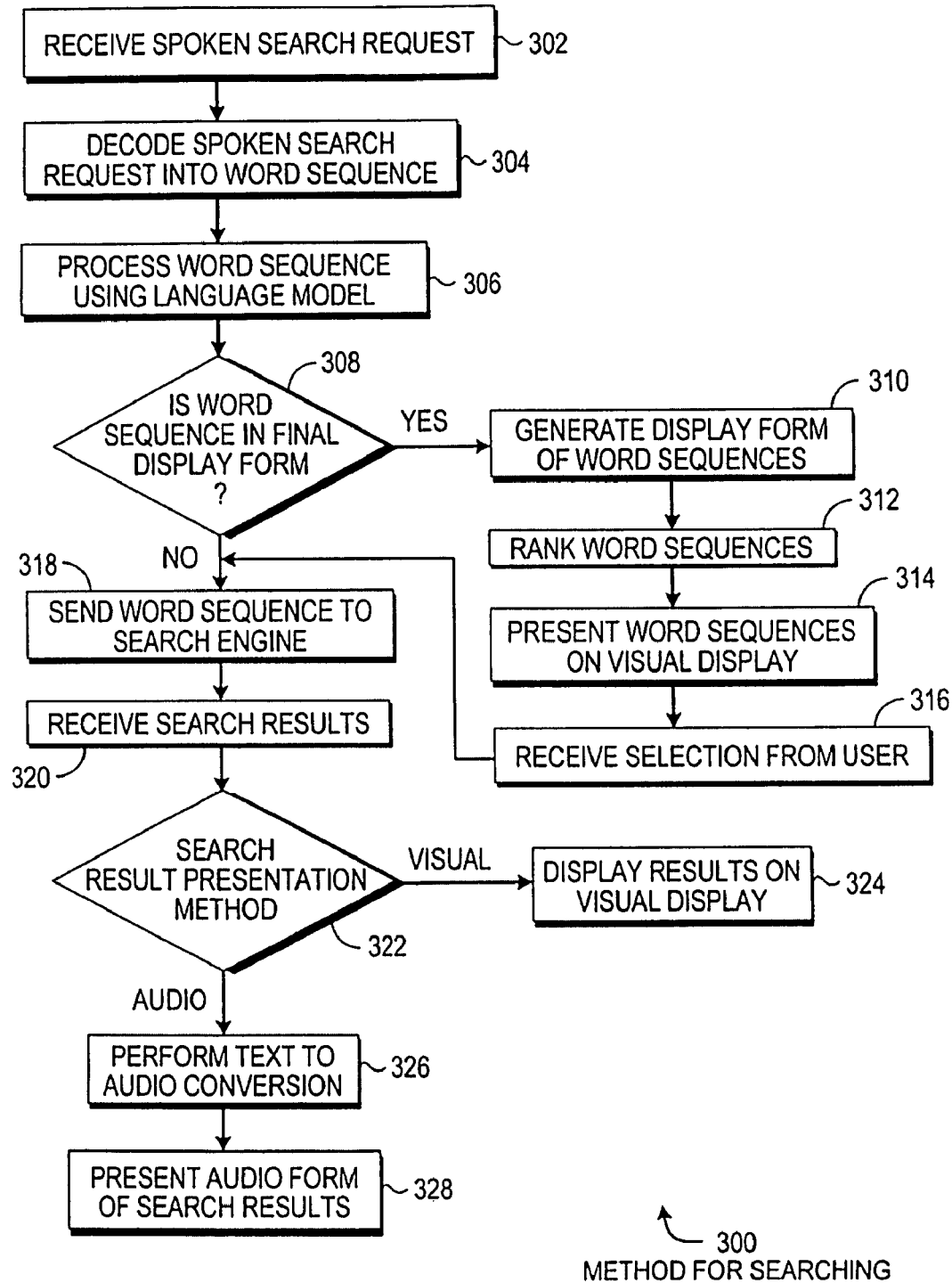
FIG. 3 is a flowchart illustration of an example embodiment showing a method for searching.

FIG. 3 is a process illustration of an embodiment 300 showing a process or method for searching using a spoken search request. Embodiment 300 is a simplified example of some of the steps that may occur when receiving a spoken search request that may contain one or more homonyms.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 illustrates one method for dealing with homonyms in a language model. The language model may be configured with different display forms of a homonym, and the display forms may follow the processed language after processing, enabling subsequent display of the terms to be properly shown.

A spoken search request may be received in block 302. The spoken search request may be decoded in block 304 into a word sequence.

The word sequence may be processed by a language model in block 306 to determine one or more word sequences that may have homonyms. When some homonyms are encountered within the language model, a display form of the homonym may be determined. The bigram of embodiment 200 is an example of a portion of such a language model.

If the word sequence in final display form in block 308, the display forms of each word sequence may be generated in block 310, ranked in block 312, and presented on a visual display in block 314. One of the homonyms may be selected by the user in block 316.

The process of blocks 310, 312, 314, and 316 may be used to disambiguate between several different options. In an example used above, a user may speak the search term "lows". The language model in block 306 may generate probable word sequences of "Lowe's Hardware", "Loews Theater", amongst other listings. The word sequences may be displayed to the user in block 314 for disambiguation.

In many embodiments, the word sequence may be determined to be in the final form in block 308 by determining if one of the sub-rules are used, such as the sub-rule 202 in FIG. 2.

The selected word sequence from block 316, or if no homonym exists and a single word sequence was determined in block 308, the word sequence may be sent to a search engine in block 318 and the search results received in block 320. If the search result presentation method is visual in block 322, the results may be displayed in block 324 on a visual display. In many cases, the displayed results in block 324 may include the display form of the word sequence analyzed in block 306.

In many embodiments, a search engine in block 318 may perform a search using homonyms of a given word. In cases where a search engine sorts the results, a result from the form of a homonym transmitted to the search engine may be ranked and sorted higher in the list of results than other search results that contain a different homonym.

If the search result presentation method in block 322 is audio, a text to audio conversion may be performed in block 326 and the audio form of the search results may be presented in block 328.

Embodiment 300 illustrates a simplified version of one embodiment where display forms of a spoken request may be used in a disambiguation process. The display forms of a spoken request may be generated by a language model in block 306 that includes separate instances of display forms of homonyms.

In an embodiment for mobile search, a user may be using a mobile device such as a handheld cellular phone, a voice activated automobile computer system, or some other device that accepts voice input. The search results from the input may be visually displayed using the display forms of words determined from automated speech recognition and language processing.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method comprising:
   receiving a spoken search request;
   decoding said spoken search request into a sequence of words;
   processing said sequence of words using a normalizing language model to determine a plurality of sets of normalized words representing said spoken search request, at least one of said words being a homonym;
   said normalizing language model comprising homonym rules defining a plurality of display forms for a homonym; and
   generating said plurality of sets of words in said display form.

2. The method of claim 1 further comprising:
   receiving an indication of a first set of words from said plurality of sets of words, one of said words within said first set of words being a homonym; and
   performing a search based on said first set of words.

3. The method of claim 2, said search being performed using a plurality of words in place of said homonym.

4. The method of claim 1, said normalizing language model comprising rules for symbol representations.

5. The method of claim 1, said normalizing language model comprising rules for homonyms comprising multiple words.

6. The method of claim 1, said homonyms comprising trade names.

7. The method of claim 1, said processing being performed by a mobile device.

8. The method of claim 1, said spoken search request being an audio file received over a network.

9. The method of claim 8, said audio file being created by a mobile device.

10. The method of claim 9, at least a portion of said plurality of sets of words being transmitted to said mobile device.

11. A system comprising:
    an audio input system configured to receive a spoken search request;
    a language processing system comprising a text normalization language model comprising rules defining a plurality of display forms for at least one homonym;
    said language processing system configured to determine a normalized set of words, at least one of said words comprising one form of said homonym; and
    a presentation engine configured to prepare said a display form of said normalized set of words on a visual display, said normalized set of words comprising a display form for said homonym.

12. The system of claim 11 further comprising:
    a search engine configured to perform a search using said display form of said normalized set of words.

13. The system of claim 12,
    said language processing system configured to determine a plurality of normalized sets of words; and
    said presentation engine configured to prepare said plurality of normalized sets of words for visual display.

14. The system of claim 13, said search engine being configured to perform said search using a selected one of said plurality of normalized sets of words.

15. The system of claim 11, said system being embodied on a mobile device.

16. The system of claim 11, said system being embodied on a network connected server.

17. The system of claim 16, said spoken search request being generated by a mobile device.

18. The system of claim 17, said visual display being a display on said mobile device.

19. A method comprising:
    receiving a spoken search request;
    processing said spoken search request into a set of words using a normalizing language model comprised of word units, a portion of said word units having a homonym;
    for each of said homonym, said language model having a separate word unit, said word unit being a display form for said homonym; and
    generating a display form for said set of words.

20. The method of claim 19, said homonym being at least one of a group composed of:
    trade names, phrases, and symbols.

* * * * *